United States Patent [19]
Ishikawa et al.

[11] Patent Number: 5,680,199
[45] Date of Patent: Oct. 21, 1997

[54] PHOTOGRAPHIC PRINTING APPARATUS HAVING TEMPERATURE CONTROLLED PLZT EXPOSURE HEAD

[75] Inventors: Masazumi Ishikawa; Tohru Tanibata, both of Wakayama-ken, Japan

[73] Assignee: Noritsu Koki Co., Ltd., Wakayama, Japan

[21] Appl. No.: 555,227

[22] Filed: Nov. 8, 1995

[30] Foreign Application Priority Data

Nov. 9, 1994 [JP] Japan .................................. 6-275018

[51] Int. Cl.⁶ ................................................ G03F 27/52
[52] U.S. Cl. ..................................... 355/30; 355/40
[58] Field of Search .................................. 355/30

[56] References Cited

U.S. PATENT DOCUMENTS 5,481,398  1/1996  Schoon ........................... 359/323

FOREIGN PATENT DOCUMENTS 4-73793  3/1992  Japan.

Primary Examiner—Arthur T. Grimley
Assistant Examiner—Shival Virmani
Attorney, Agent, or Firm—Wenderoth, Lind & Ponack

[57] ABSTRACT

A photographic printing apparatus is provided with a linear exposure head arranged across and at a right angle to a transfer direction of a photosensitive material for exposing the photosensitive material to controlled light. The exposure head has a heater that is controlled by a controller so that the exposure head is maintained at a constant temperature.

5 Claims, 4 Drawing Sheets

PHOTOGRAPHIC PRINTING APPARATUS HAVING TEMPERATURE CONTROLLED PLZT EXPOSURE HEAD

BACKGROUND OF THE INVENTION

The present invention relates to a photographic printing apparatus provided with a linear exposure head.

PLZT exposure heads are known to have a transparency characteristic which varies with temperature as shown in FIG. 5. In a conventional photographic printing apparatus provided with a PLZT exposure head, transparency of the PLZT exposure head is decreased when its temperature is too low, thus producing a lighter exposure result. If the temperature is too high, transparency of the PLZT exposure head increases, thus producing a heavier exposure result.

For compensation, an intensity of emitting light from a light source in the PLZT exposure head of the conventional photographic printing apparatus has to be adjusted depending changes of transparency.

It is however not easy to control the intensity of light from the light source precisely in response to transparency changes, allowing the quality of pictures to remain inconstant.

It is an object of the present invention, in view of the above predicament, to provide a photographic printing apparatus in which the temperature of an exposure head is maintained uniform to produce high quality pictures.

SUMMARY OF THE INVENTION

A photographic printing apparatus of on embodiment of the present invention is provided with a linear exposure head arranged across and at a right angle to a transfer direction of a photosensitive material for exposing the photosensitive material to controlled light and includes a heater mounted to the exposure head and controlled by a controller means so that the exposure head is maintained at a constant temperature.

A photographic printing apparatus of another embodiment of the present invention is provided with a linear exposure head arranged across and at a right angle to the transfer direction of a photosensitive material for exposing the photosensitive material to controlled light and includes a radiator mounted to the exposure head and a circulation passage for a processing liquid disposed between the radiator and a processor in which the processing liquid is maintained at a constant temperature by a thermal adjusting means.

A photographic printing apparatus of a further embodiment of the present invention is provided with a linear exposure head arranged across and at a right angle to the transfer direction of a photosensitive material for exposing the photosensitive material to controlled light and includes two radiators mounted to the exposure head and a processing liquid tank in a processor, respectively, the processing liquid tank containing a processing liquid maintained at a constant temperature by a thermal adjusting means, and a circulation passage for a heat exchange liquid medium disposed between the radiator on the exposure head and the radiator in the processor.

In the photographic printing apparatus of the first embodiment, the temperature of the exposure head is maintained constant by the action of the heater on the exposure head, thus assuring a uniform transmission of light through the exposure head.

In the photographic printing apparatus of the second embodiment, the processing liquid controlled by the thermal adjusting means to be maintained at a constant temperature is passed through the circulation passage to the radiator for heat exchange, thus allowing the exposure head to remain at a constant temperature.

In the photographic printing apparatus of the third embodiment, the heat exchange liquid medium is passed from the radiator in the processing liquid tank to the radiator on the exposure head in the circulation passage for heat exchange, thus allowing the exposure head to remain at a constant temperature.

DETAILED DESCRIPTION OF THE PREFERRED EMBODIMENTS

Embodiment 1

Figure 1:
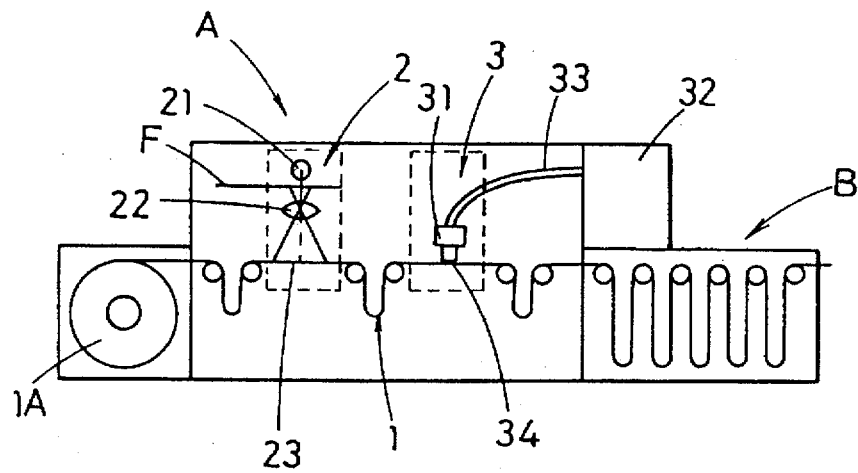
FIG. 1 is a schematic view of a photographic printing apparatus.

FIG. 1 is a schematic view of a photographic printing apparatus A which includes an exposure means 2 and a double exposure means 3 aligned along a transfer path of a printing paper 1 (photosensitive material) starting from a magazine 1A.

The photographic printing apparatus A is also connected to a processor B for a developing process of the printing paper 1.

The exposure means 2 comprises a light source 21, a lens 22, an optical modulation filter (not shown) arranged for moving through and from a light path between the light source 21 and a negative film F, and a mechanical shutter (not shown) for mechanically interrupting the light path extending from the light source 21. An intensity of exposure light from the light source 21 is passed through the negative film F and is incident on the printing paper 1 at a negative exposure station 23 for printing a picture of the negative film F (FIG. 1).

The double exposure means 3 is provided for exposing the printing paper 1 transferred dot by dot to an intensity of light from a linear PLZT exposure head 31 which is mounted at a right angle to the transferring direction of the printing paper 1.

The PLZT exposure head 31 has multiple rows of PLZT exposure shutters arranged to allow exposure light transmitted through a bundle of optical fibers 33 from a PLZT light source 32 to produce dots of an optical image which is printed on the printing paper 1 at a line exposure station 34 (FIG. 1).

Figure 2:
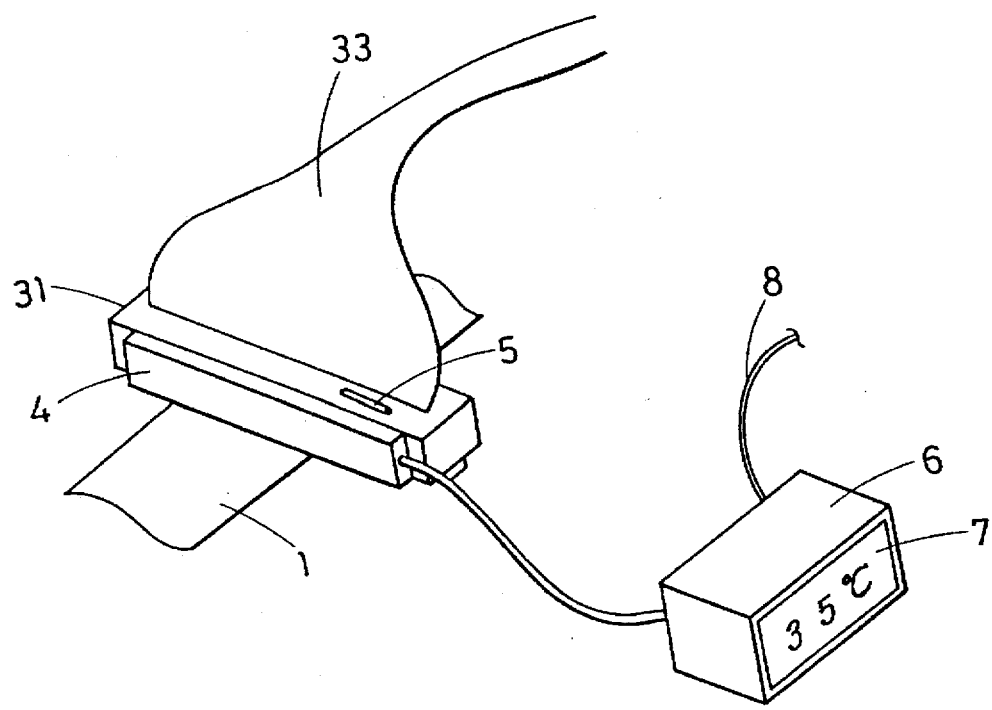
FIG. 2 is a perspective view showing a first embodiment of the present invention.
Figure 3:
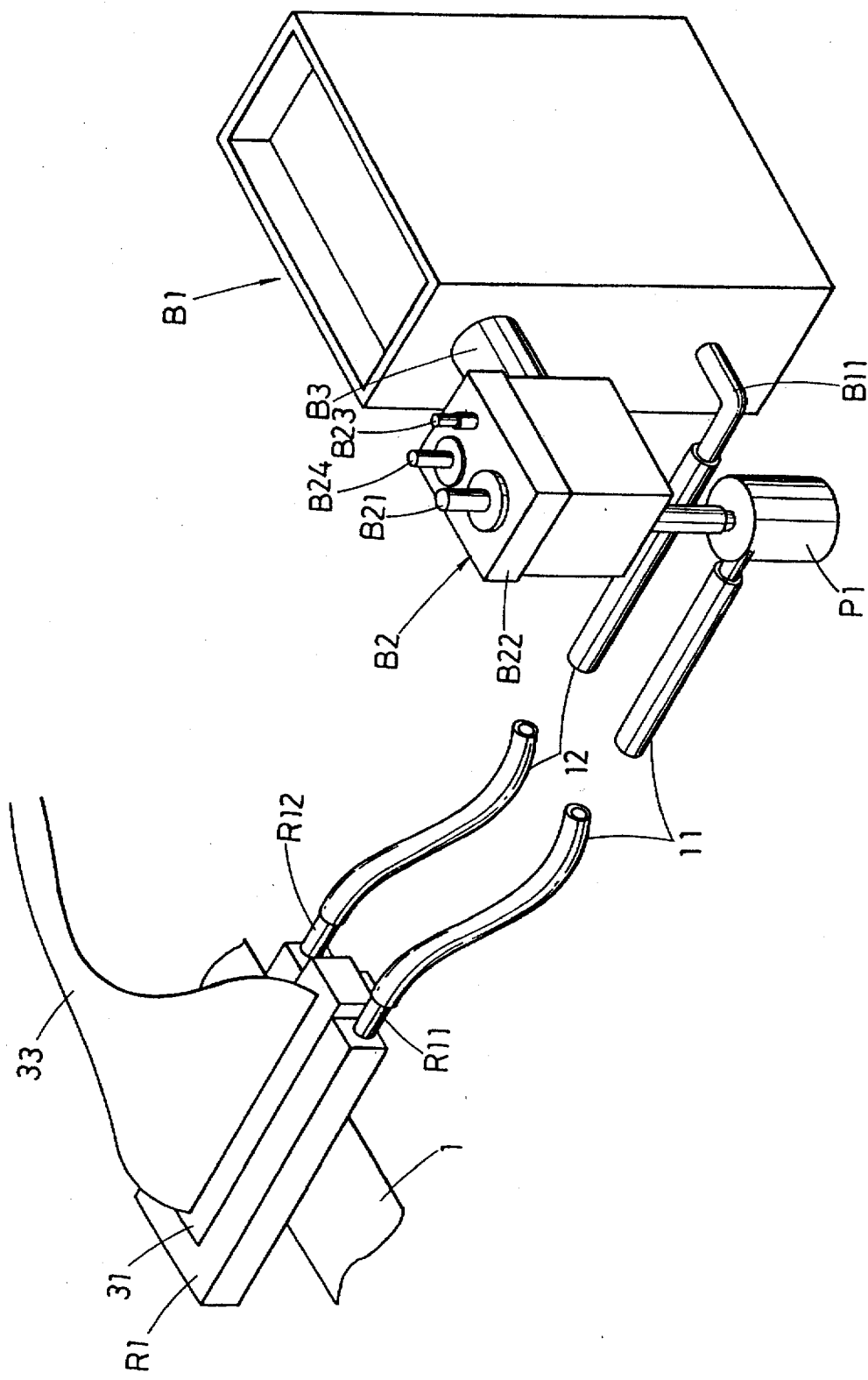
FIG. 3 is a perspective view showing a second embodiment of the present invention.
Figure 4:
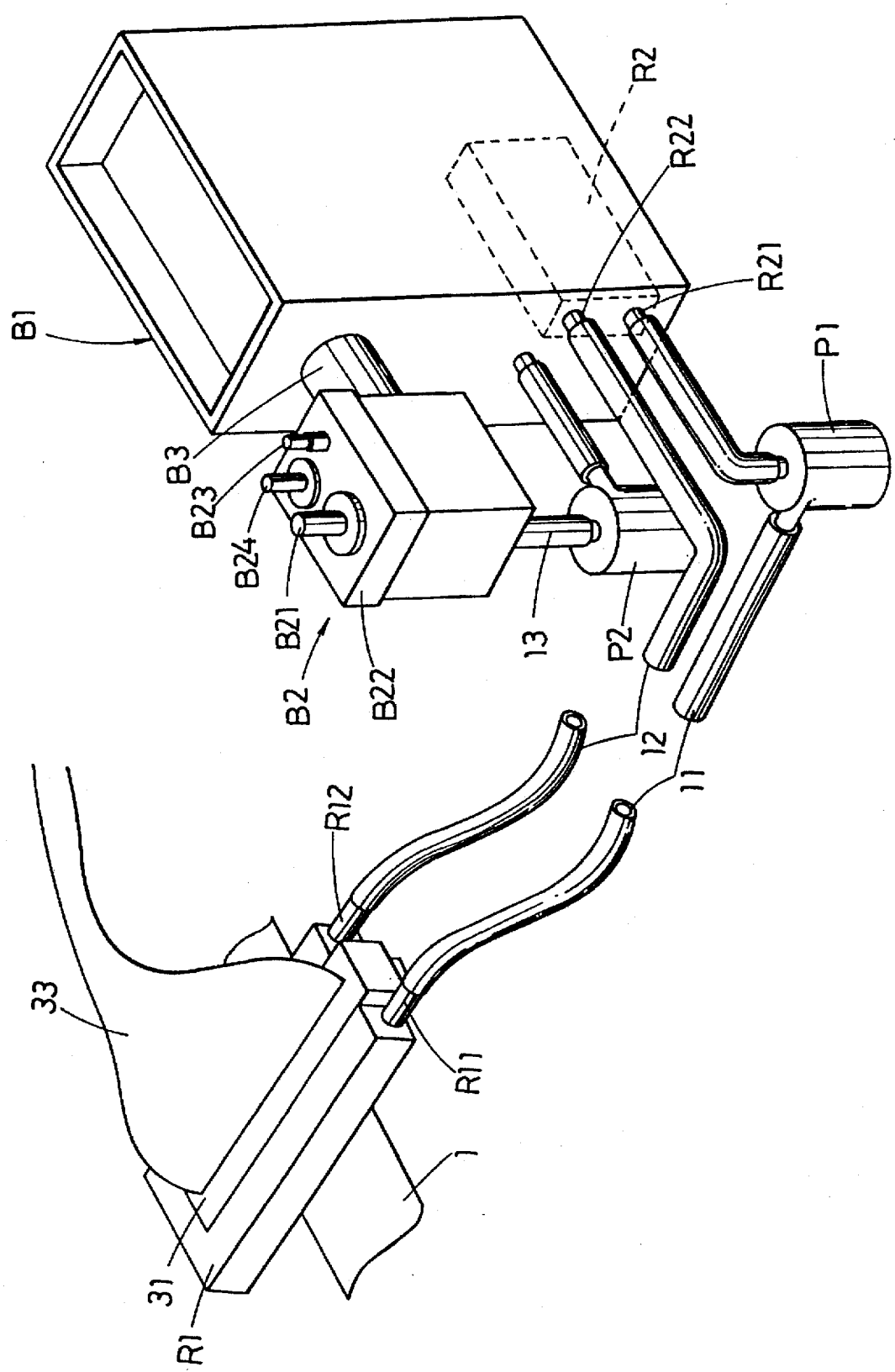
FIG. 4 is a perspective view showing a third embodiment of the present invention.
Figure 5:
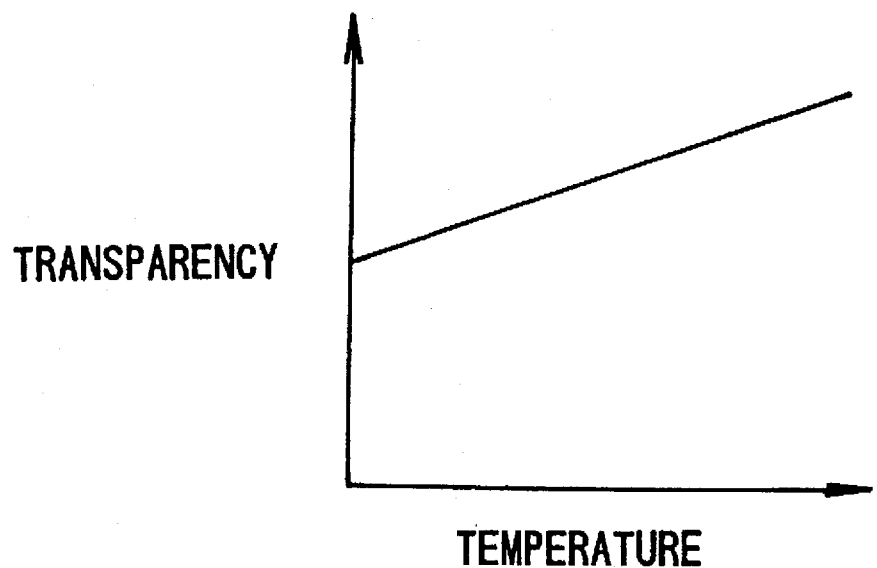
FIG. 5 is diagram showing the relation between temperature and transparency in an exposure head.

Also, the PLZT exposure head 31 has a longitudinal heater 4 mounted lengthwisely on an outer side thereof and a thermal bar sensor 5 mounted on the upper side thereof (FIG. 2).

There is provided a controller means 6 which is responsive to a detection signal of the thermal bar sensor 5 for controlling the heater 4 to maintain the PLZT exposure head 31 at a constant temperature (FIG. 2).

A temperature display 7 is provided for display of the temperature of the PLZT exposure head 31 which can be read by an operator (FIG. 2). The controller means 6 and the display 7 are energized through a power supply line 8.

The locations of the heater 4 and the thermal bar sensor 5 are not limited to the arrangement of FIG. 2 and, for example, the heater 4 may be installed in the PLZT exposure head 31.

The printing paper 1 exposed to light at negative exposure station 23 and/or the line exposure station 34 is then transferred to the processor B where it is developed and cut into prints.

Embodiment 2

A photographic printing apparatus includes an exposure means and a double exposure means aligned along a transfer path of a printing paper 1.

Both the exposure means and double exposure means are similar in construction to those of Embodiment 1.

The photographic printing apparatus is also connected to a processor for a developing process of the printing paper 1.

A linear PLZT exposure head 31 in the double exposure means of this embodiment has a U-shaped radiator R1 mounted thereabout.

The radiator R1 has a liquid inlet R11 at one end thereof and a liquid outlet R12 at the other end.

There is provided in the processor a processing liquid tank B1 which contains a developer liquid (an exemplary chemical) for the developing process of the printing paper 1.

The processing liquid tank B1 has a liquid return inlet B11 provided in a lower region thereof.

A sub tank B2 is mounted on the processing liquid tank B1, and is communicated through a conduit B3 to an upper region of the processing liquid tank B1.

The sub tank B2 has a filter B21 mounted in the interior thereof. Also, a thermal bar sensor B23 and a heater B24 are mounted to the upper side of the sub tank B2 where the uppermost end of the filter B21 is exposed.

In action, the developer liquid in the processing liquid tank B1 is maintained at a constant temperature by a controller means (not shown) which controls the heater B24 in response to a detection signal from the thermal bar sensor B23.

The processing liquid tank B1 and sub tank B2 are connected by a supply conduit 11 to the liquid inlet R11 of the radiator R1. The liquid outlet R12 of the radiator R1 is connected by a return conduit 12 to the liquid return inlet B11 of the processing liquid tank B1, thus forming a circulating passage of the developer liquid. A pressure pump P1 is mounted across the supply conduit 11 for conveying the developer liquid from the processing liquid tank B1 to the radiator R1 where the developer liquid is subjected to heat exchange before being returned to the processing liquid tank B1.

Accordingly, the temperature of the PLZT exposure head 31 can be maintained to a constant degree by the controlled temperature of the developer liquid.

Embodiment 3

A photographic printing apparatus includes an exposure means and a double exposure means aligned along a transfer path of a printing paper 1.

Both the exposure means and double exposure means are similar in construction to those of Embodiment 1.

The photographic printing apparatus is also connected to a processor for a developing process of the printing paper 1.

A linear PLZT exposure head 31 in the double exposure means of this embodiment has a U-shaped radiator R1 mounted thereabout.

There is provided in the processor a processing liquid tank B1 which contains a developer liquid (an exemplary chemical) for a developing process of the printing paper 1.

A sub tank B2 is mounted on the processing liquid tank B1 and is communicated through a conduit B3 to an upper region of the processing liquid tank B1.

The sub tank B2 has a filter B21 mounted in the interior thereof. Also, a thermal bar sensor B23 and a heater B24 are mounted to the upper side of the sub tank B2 where the uppermost end of the filter B21 is exposed.

In action, the developer liquid in the processing liquid tank B1 is maintained at a constant temperature by a controller means (not shown) which controls the heater B24 in response to a detection signal from the thermal bar sensor B23.

The sub tank B2 is communicated at the bottom thereof by a conduit 13 having a pump P2 to a lower region of the processing liquid tank B1. This allows the developer liquid to be continuously conveyed by the action of the pump P2 from the processing liquid tank B1 into the sub tank B2 for clarification with the filter B21 and returned back through the conduit 13 to the processing liquid tank B1 for circulation.

An additional radiator R2 is mounted in the processing liquid tank B1.

The radiator R2 has a liquid outlet R21 and a liquid outlet R22 both arranged at one end thereof.

The liquid outlet R21 of the radiator R2 in the processing liquid tank B1 is connected by supply conduit 11 to liquid inlet R11 of the radiator R1 on the PLZT exposure head 31. Also, liquid outlet R12 of the radiator R1 is communicated through a return conduit 12 to the liquid inlet R22 of the radiator R2 in the processing liquid tank B1, thus forming a circulation passage of water (an exemplary liquid as a heat exchange medium). A pressure pump P1 is mounted across the supply conduit 11 for conveying a flow of water throughout the circulation passage where heat exchange is carried out at the two radiators R1 and R2. This allows the temperature of the PLZT exposure head 31 to be maintained constant by the controlled temperature of the developer liquid.

We claim:

1. A photographic printing apparatus comprising:
   a linear exposure head arranged across and at a right angle to a transfer direction of a photosensitive material for exposing the photosensitive material to controlled light;
   a heater mounted on said exposure head; and
   controller means operably connected to said heater to control operation thereof and to maintain said exposure head at a constant temperature.

2. A photographic printing apparatus comprising:
   a linear exposure head arranged across and at a right angle to a transfer direction of a photosensitive material for exposing the photosensitive material to controlled light;
   a radiator mounted on said exposure head;

a processing liquid tank storing a processing liquid;

a circulation passage disposed between said tank and said radiator for passing therebetween the processing liquid; and thermal adjusting means, including a thermal sensor, a heater and a controller, for maintaining the processing liquid at a constant temperature and thereby for maintaining said exposure heat at a constant temperature.

3. An apparatus as claimed in claim 2, wherein said circulation passage includes a sub tank into which the processing liquid passes from said tank and from which the processing liquid passes to said radiator, and said thermal adjusting means is operable to control the temperature of the processing liquid in said sub tank.

4. A photographic printing apparatus comprising:

a linear exposure head arranged across and at a right angle to a transfer direction of a photosensitive material for exposing the photosensitive material to controlled light;

a processing liquid tank storing a processing liquid;

a first radiator mounted on said exposure head;

a second radiator on said tank;

a circulation passage disposed between said first and second radiators for passing therebetween a heat exchange liquid medium; and thermal adjusting means for maintaining the processing liquid at a constant temperature and thereby for, due to heat exchange between the processing liquid and the heat exchange liquid medium and between the heat exchange liquid medium and said exposure head, maintaining said exposure heat at a constant temperature.

5. An apparatus as claimed in claim 4, further comprising a sub tank connected to said tank so that the processing liquid can circulate therebetween, and said thermal adjusting means is operable to control the temperature of the processing liquid in said sub tank.

* * * * *